US008045303B2

(12) United States Patent
Curl et al.

(10) Patent No.: US 8,045,303 B2
(45) Date of Patent: Oct. 25, 2011

(54) BUILDING SERVICE GROUND FAULT INTERRUPTER

(75) Inventors: Ricky Curl, Pinson, AL (US); Fred von Herrmann, Homewood, AL (US)

(73) Assignee: The Von Corporation, Birmingham, AL (US)

( * ) Notice: Subject to any disclaimer, the term of this patent is extended or adjusted under 35 U.S.C. 154(b) by 16 days.

(21) Appl. No.: 12/436,485

(22) Filed: May 6, 2009

(65) Prior Publication Data

US 2009/0279217 A1 Nov. 12, 2009

Related U.S. Application Data

(60) Provisional application No. 61/051,170, filed on May 7, 2008.

(51) Int. Cl.
*H02H 3/00* (2006.01)
*H02H 9/08* (2006.01)

(52) U.S. Cl. ................ 361/42; 361/43; 361/44; 361/45; 361/46; 361/47; 361/48; 361/49

(58) Field of Classification Search .................... 361/42
See application file for complete search history.

(56) References Cited

U.S. PATENT DOCUMENTS

| | | | | |
|---|---|---|---|---|
| 4,546,309 | A * | 10/1985 | Kang et al. | 324/529 |
| 5,459,630 | A | 10/1995 | MacKenzie | |
| 5,630,954 | A | 5/1997 | Toth | |
| 2006/0190140 | A1* | 8/2006 | Soni | 700/295 |
| 2006/0252304 | A1* | 11/2006 | Shoop et al. | 439/517 |
| 2008/0204955 | A1* | 8/2008 | Parker et al. | 361/87 |

* cited by examiner

*Primary Examiner* — Dharti Patel
(74) *Attorney, Agent, or Firm* — Smith, Gambrell & Russell

(57) ABSTRACT

A ground fault interrupter to be used by utility company while effecting repairs to the electrical service for a building is positioned to interrupt the power supply to the building in case of a detected ground fault and utilizes a sensor for detecting the fault current at the service entrance to a building; a contact switch, selectively movable between open and closed positions, mounted for temporary use in series with said power supply to the building; and a microprocessor based circuit for measuring and evaluating fault current detected by the sensor and controlling the selective movement of the contact switch between its open and closed positions.

7 Claims, 15 Drawing Sheets

BUILDING SERVICE GROUND FAULT INTERRUPTER

RELATED APPLICATION

This application claims priority to U.S. provisional patent application no. 61/051,170, filed May 7, 2008, which is incorporated herewith by reference.

BACKGROUND

The present invention relates to electrical service to a building and more particularly to monitoring and controlling the electrical service to a building during periods of repair to the electrical service. More particularly, the presentinvention is a ground fault interrupter device to be installed by an electric utility company while temporary equipment of the company is in place to restore a subscriber's power after a wiring failure in the underground power line feeding the building. In even greater particularity, the ground fault interrupter of the invention is to be installed at the subscriber's house or other building between the power meter and the power meter socket.

OBJECT OF THE INVENTION

It is an object of the present invention to reduce the possibility of ground fault current flowing on the cable TV, gas, water, or telephone lines instead of over the building neutral connection in situations when that neutral connection fails.

It is another object of the invention to provide a temporary monitoring device to detect and prevent ground fault current over the building service during service repair operations.

BRIEF DESCRIPTION OF THE DRAWINGS

The interrupter is depicted in the appended drawings which form a portion of this disclosure and wherein.

DESCRIPTION OF THE PREFERRED EMBODIMENT

Figure 1:
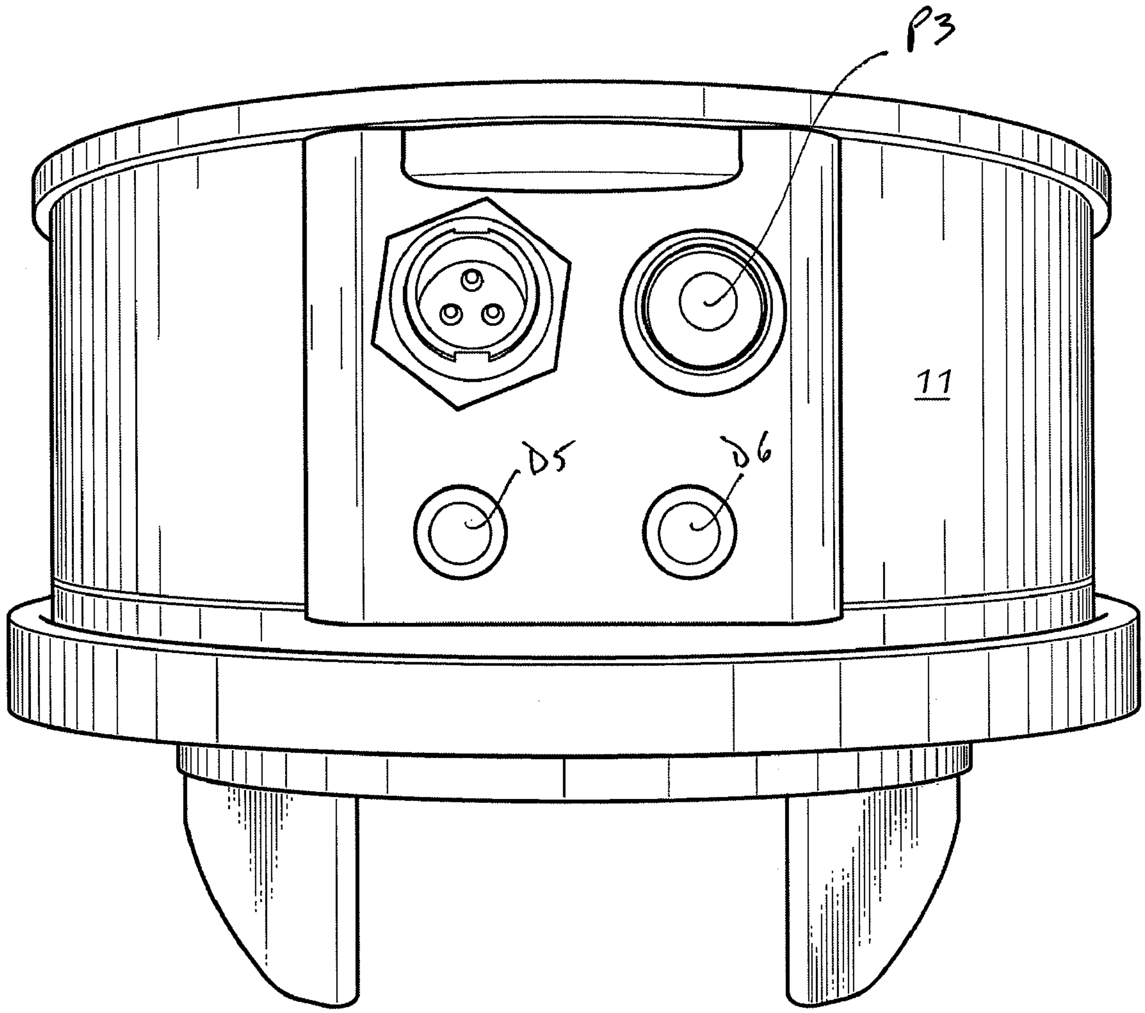
FIG. 1 is a side elevation view of the collar housing the interrupter.
Figure 2:
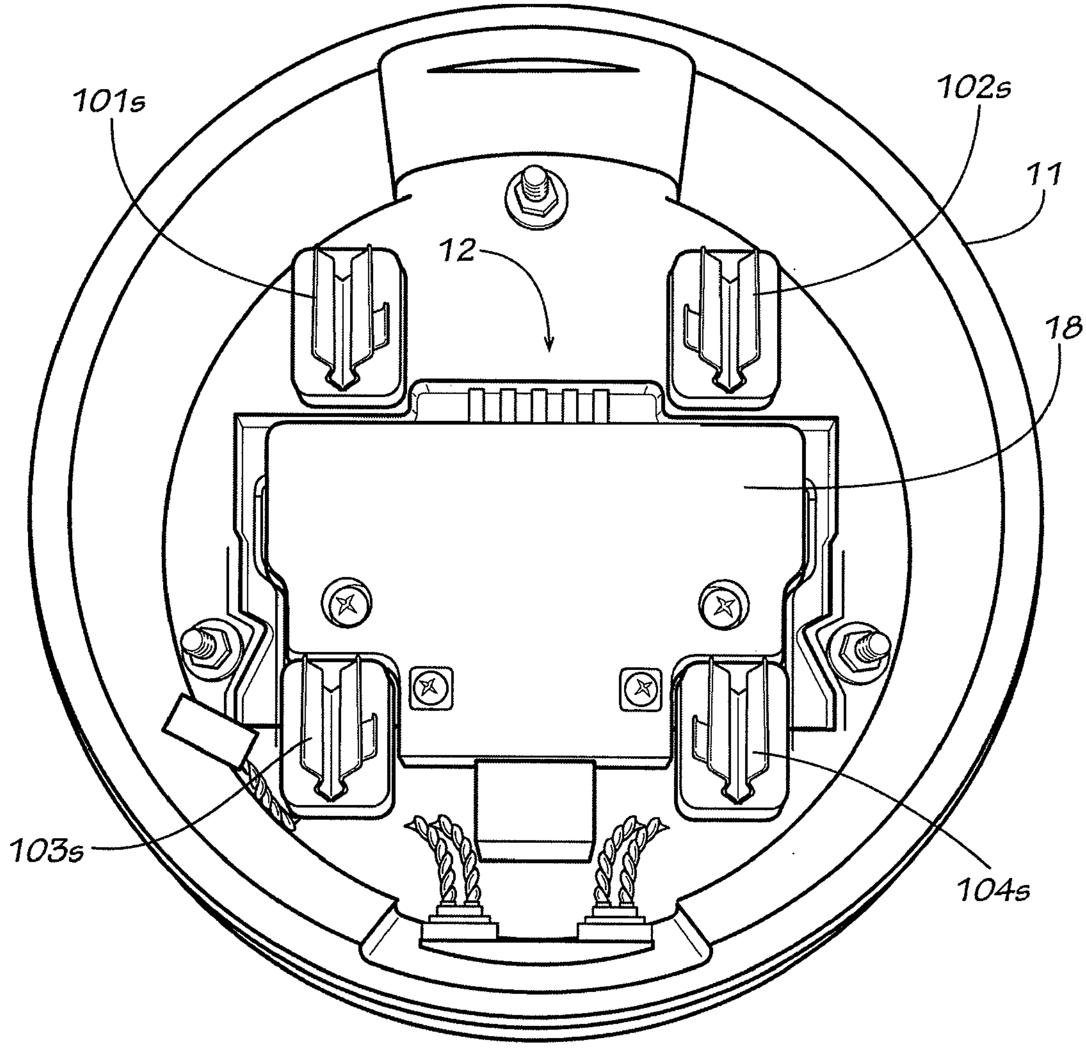
FIG. 2 is a pictorial side elevation view of the interrupter on the side adjacent the building meter socket.
Figure 3:
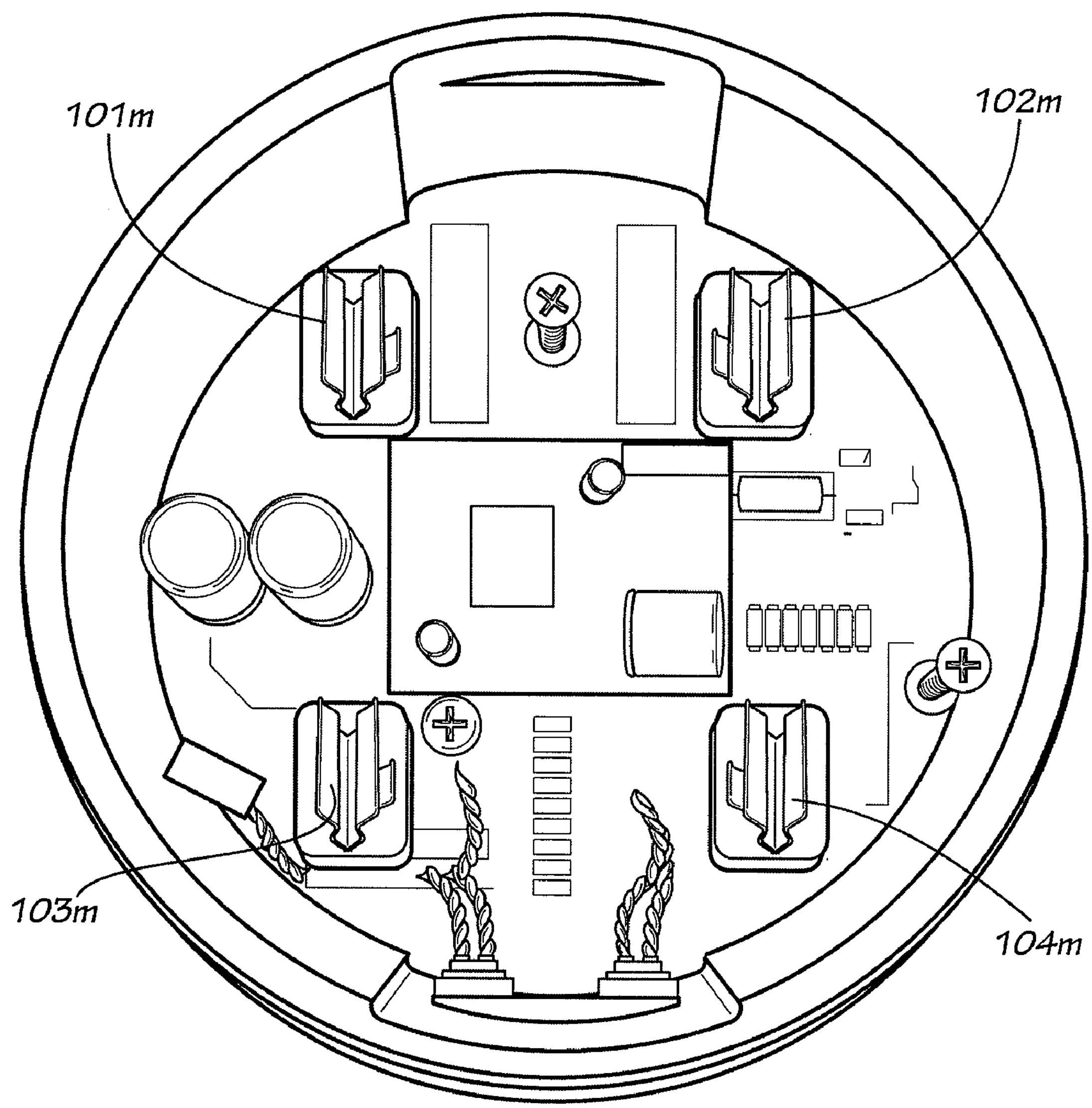
FIG. 3 is a pictorial side elevation view of the interrupter facing the power meter.

Referring to the drawings for a clearer understanding of the apparatus, it will be understood from FIG. 1 to 3 that an electric utility company utilizes the present apparatus with a residence or other building to monitor and control the service to the building at the power meter location. To utilize the apparatus, an existing power meter is removed from its complementary existing meter socket on the building. An appropriately sized collar 11, typically made of fiberglass-reinforced polycarbonate, housing the interrupter circuit 12 is installed in the meter socket making electrical contact with the building wiring through contacts 101*s* to 104*s*, and then the existing meter is re-installed into collar 11, making electrical connection with the contacts 101*m* to 104*m*. A mechanically-held 200-amp two-pole contactor 18 , such as a BLP 200 Amp rated model shown in FIG. 3, which has two coils-one for OPEN and the other for CLOSE, is mounted in collar 11 and is used to interrupt service to the building if a ground fault is detected. Contactor 18 is connected to the control circuit via connector J1.

Figure 4:
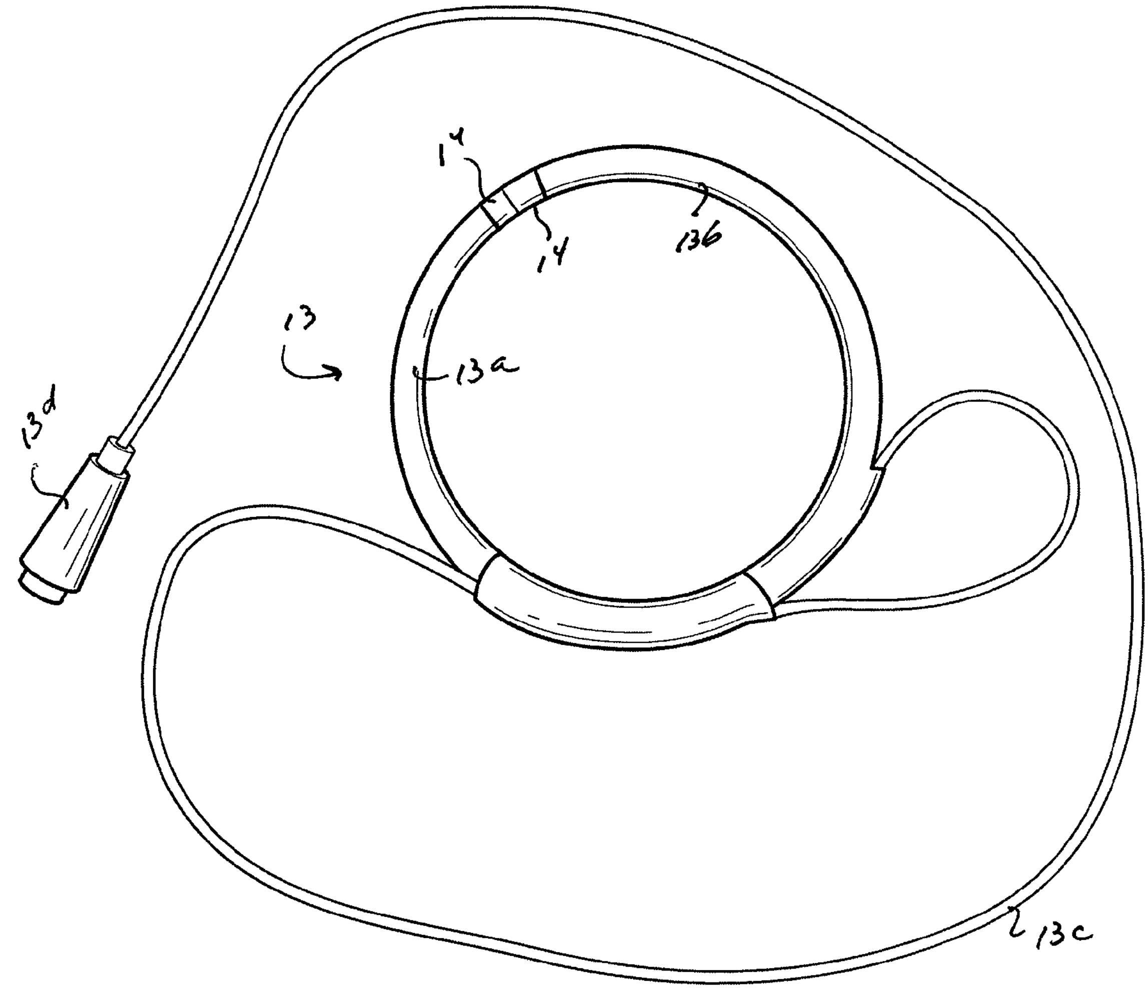
FIG. 4 is a plan view of the fault current sensor.

Fault current sensing is accomplished by means of a split-core current transformer 13, shown in FIG. 4, that is installed around the conduit providing the electrical service feeding the building. This current sensor may be a flexible Rogowski coil adapted for engagement about said service entrance. Transformer 13 can be used with both PVC and metallic conduit. As shown in FIG. 4 transformer 13 is formed with two halves 13*a* and 13*b* which are held together using neodymium magnets 14 rather than a more complex latching assembly. The sensing transformer is connected to the interrupter circuit 12 by line 13*c* and plug 13*d*.

Figure 5A:
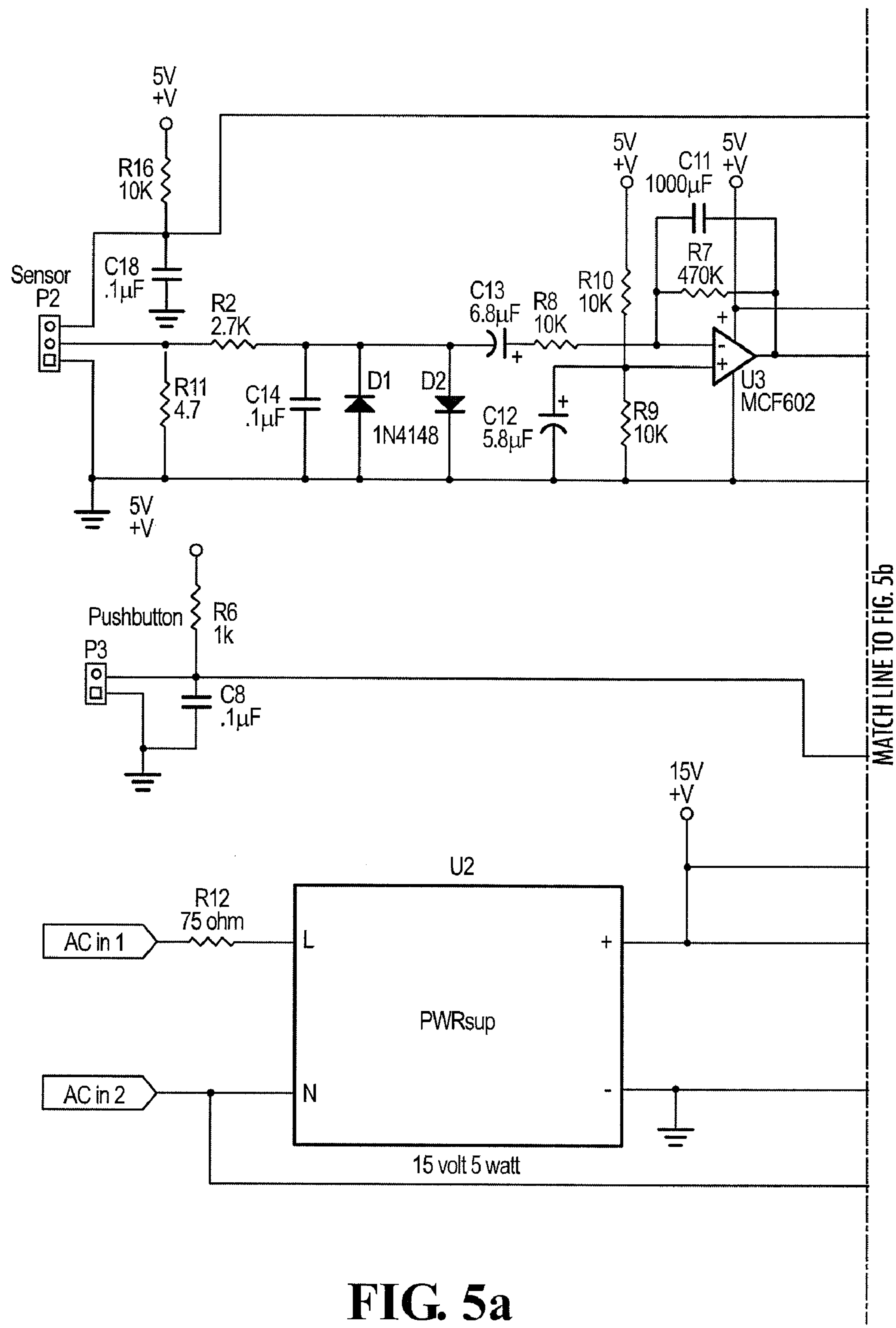
FIG. 5 is a schematic diagram of the electrical circuit of the interrupter.
Figure 5B:
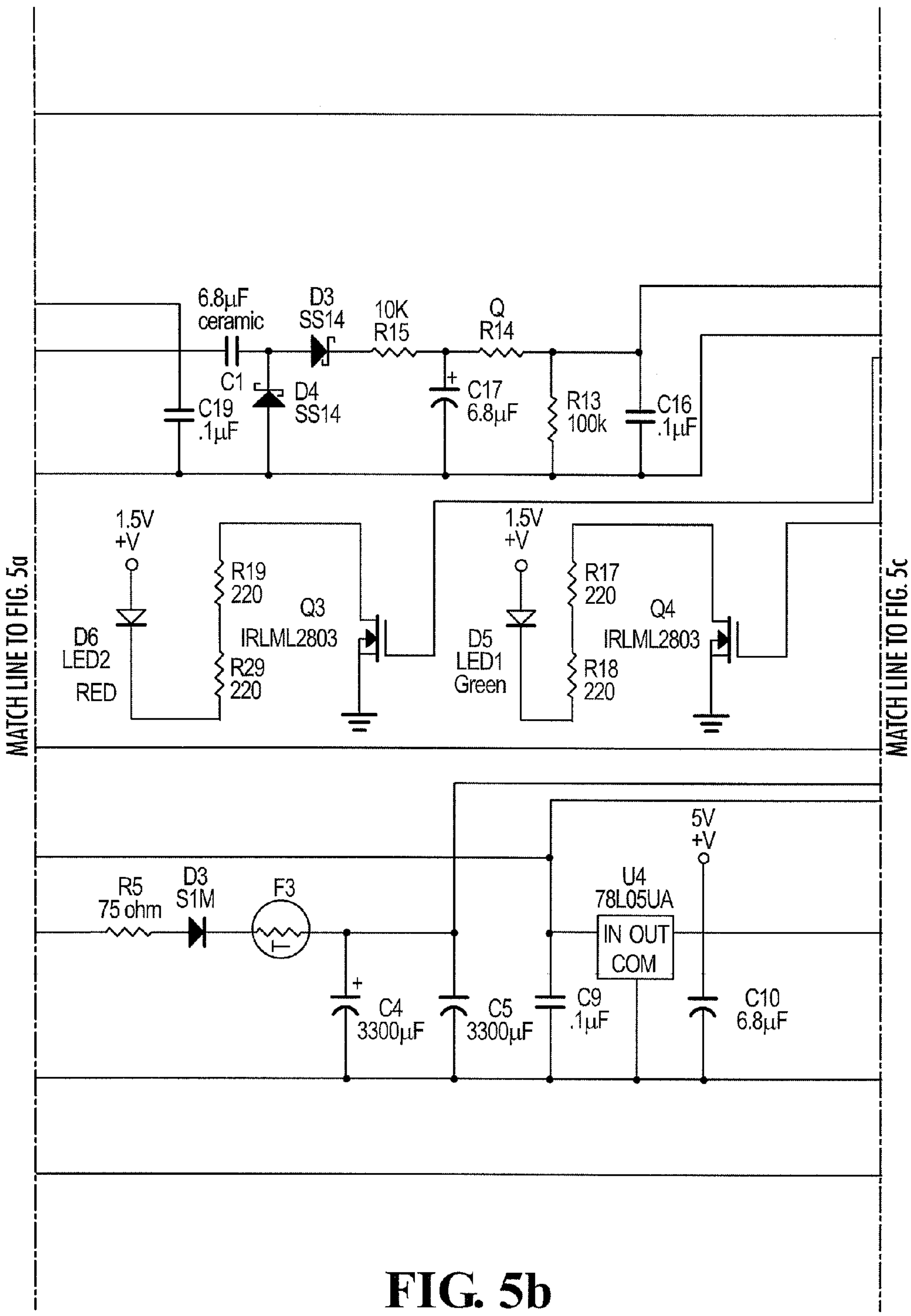
Figure 5C:
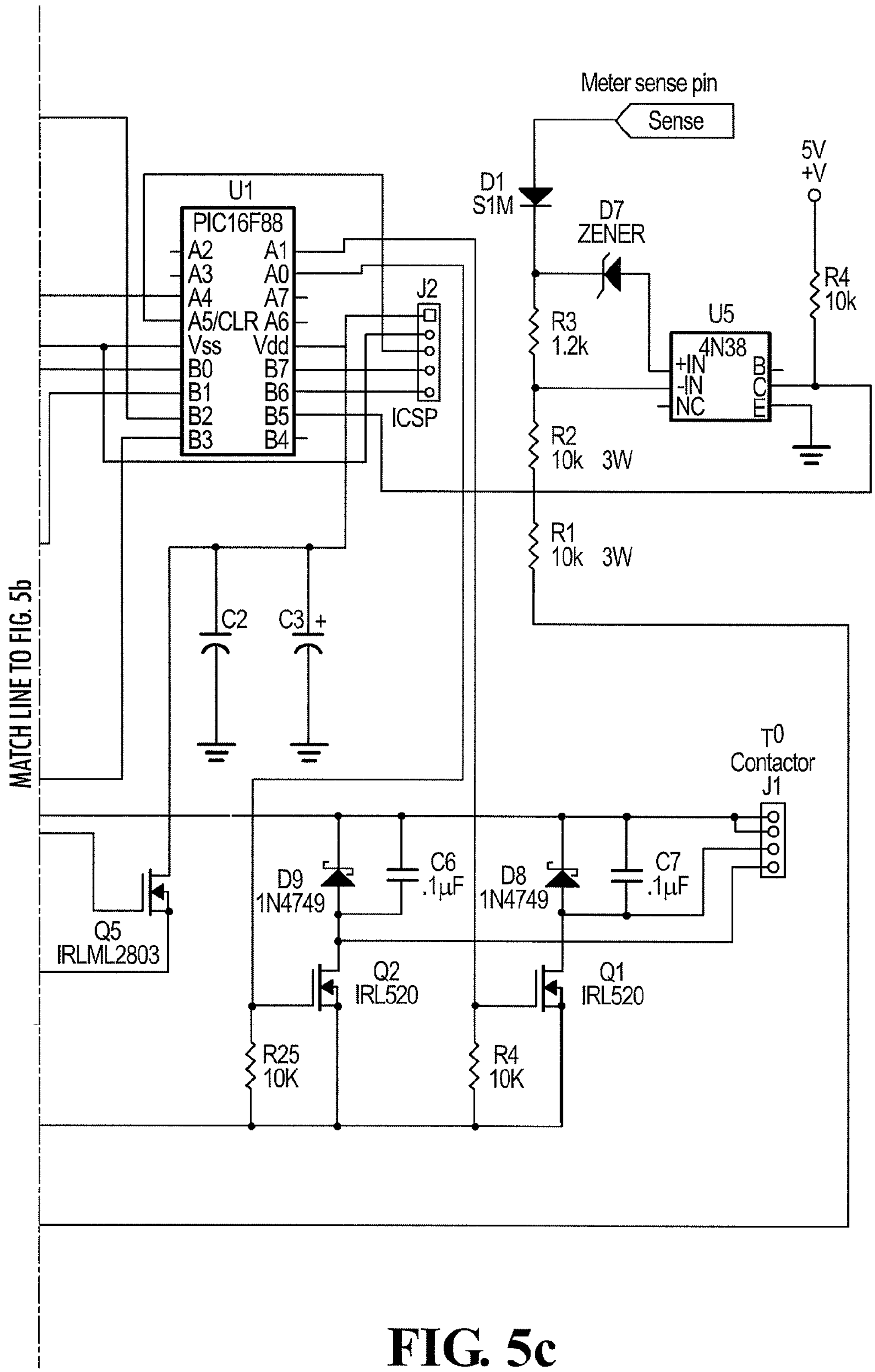

Referring to FIGS. 2 & 5 , the signal from current sense transformer 13 is fed via plug 13*w* to a shunt resistor R11, then to a low-pass filter, and then to an operational amplifier U3, such as a MCP602 available from Microchip Technology. The output of the operational amplifier is AC coupled into a peak detector. The signal from the peak detector is fed into an analog to digital converter at A4 in a microprocessor U1, such as a PIC 16F88. Microprocessor U1 controls contactor 18. The PIC microprocessor is programmed via connector J2.

The circuit includes a wide-input 15 volt DC supply U2. The wide input is necessary so it can run on either 120 or 240 volts. The input to the supply is connected across both 120 volt legs, but it must be able to operate if one leg is faulty. The voltage from the power supply is reduced to 5 volts at U4, which may be a 78LO5UA voltage regulator, to supply microprocessor U1 and operational amplifier U3. A large capacitor C2/C3 is connected across the supply to microprocessor U1 to enable the microprocessor's internal timer to function in the absence of input power.

A bank of storage capacitors C4 and C5 connected to the 15 volt output of power supply U2 through an appropriate current limiting circuit. The energy stored in these capacitors is used to operate mechanical two-pole main contactor 18 in the absence of input power. Two MOSFETS Q1 & Q2 driven by the microprocessor at A1 and A0 dump the charge from energy storage capacitors C4 and C5 into contactor 18 via J1 to cause it to operate in the absence of actuating power from power supply U2.

A pushbutton P3, mounted on collar 11, is connected to microprocessor U1 at B3, and two status-indicator LED's—one red D6 nd one green D5 also mounted on collar 11, are connected to the microprocessor U1 at B0 and B1. An optically-isolated circuit D1/D7/U5, using a device such as a 4N38 phototransistor-type optically coupled opto-isolator, monitors line voltage and presents a pulse train to the microprocessor any time the input voltage is above a specified minimum value.

The operational features of the circuit described above are described and depicted in the flow charts of FIGS. 6*a* to 6*h*.

Figure 6A:
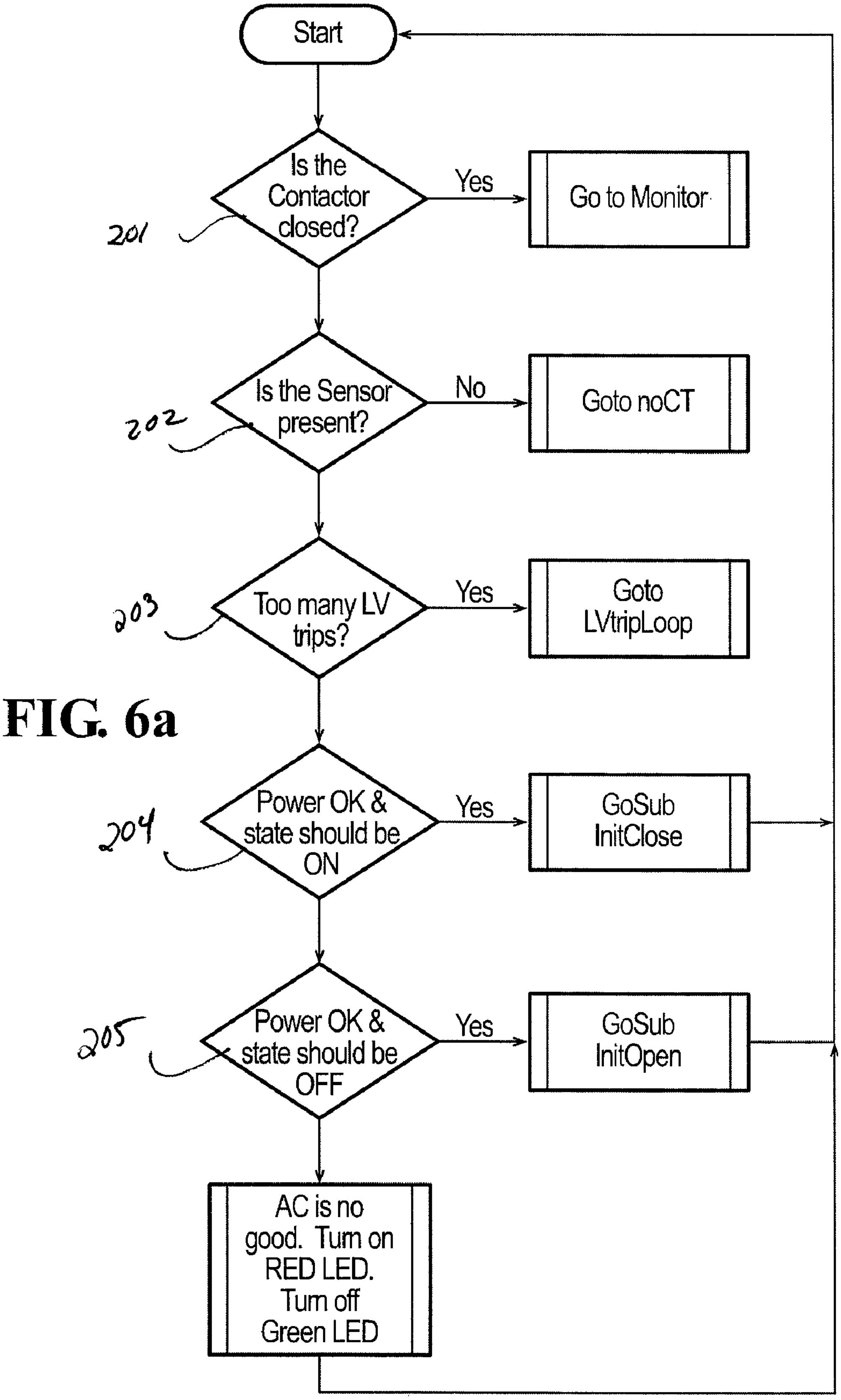
FIG. 6*a* to 6*h* are flow charts of the main loop of the interrupter control process and of the subroutines of the interrupter control process.

The contactor 18 is always in the OPEN position when power is initially applied, thus in FIG. 6*a* at step 201 the microprocessor U1 will first attempt a self test. Specifically, the microprocessor checks at 201 as to the state of the contactor 18, at 202 as to the presence of the current sensing transformer 13, at 203 as to AC voltage ensure that it is above a preset minimum value. Assuming the AC is OK, then microprocessor U1 at step 204 checks its nonvolatile memory to determine whether the main contactor was open or closed the last time the interrupter was used; i.e. was the power to the subscriber off or on. If it was closed, power ON, the sub routine InitClose is initiated. If it was open, power off, the last time the interrupter was used, subroutine InitOpen is initiated at step 205. If the AC power is not OK, then the red LED D6 is illuminated and green LED D5 is turned off.

Figure 6B:
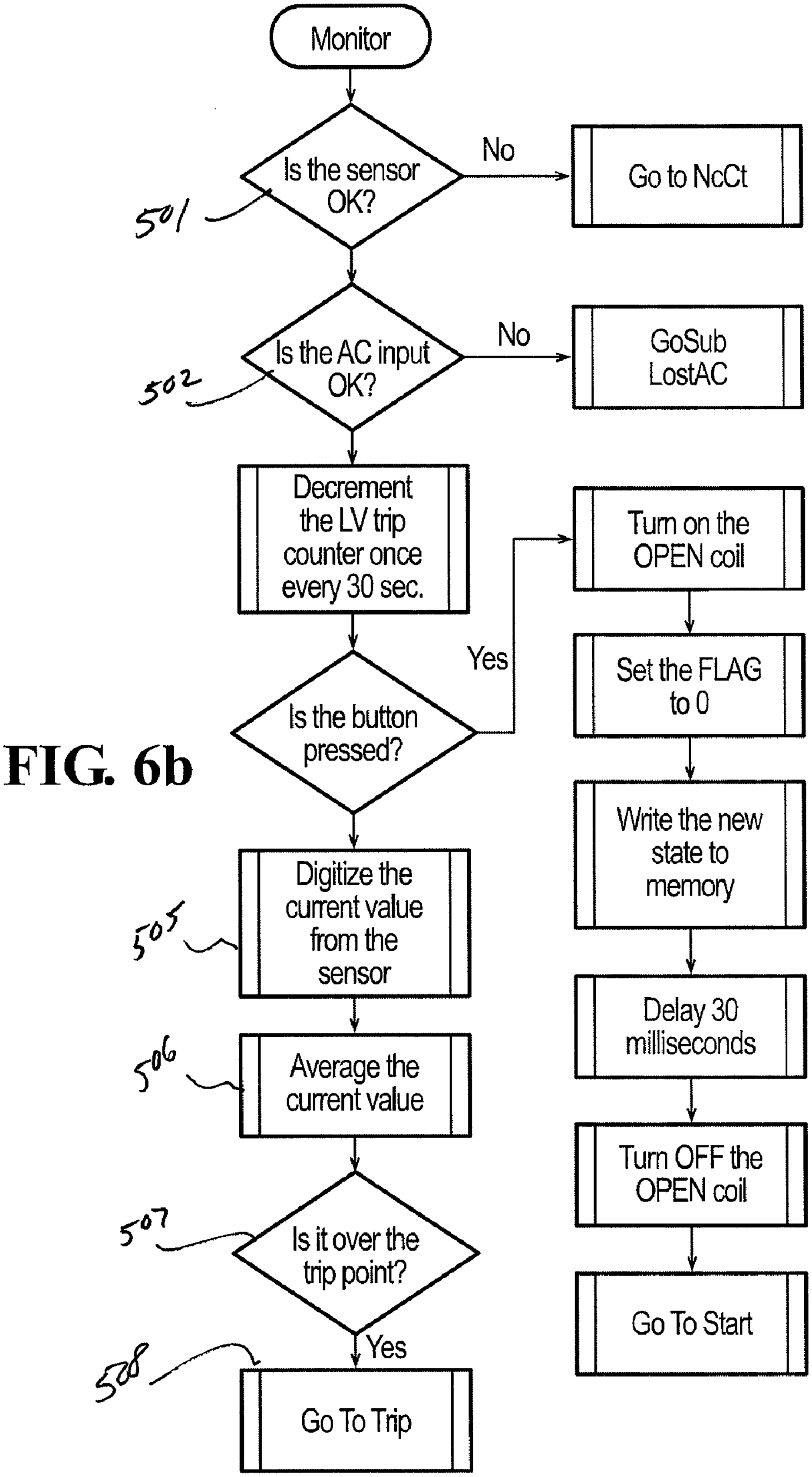
Figure 6C:
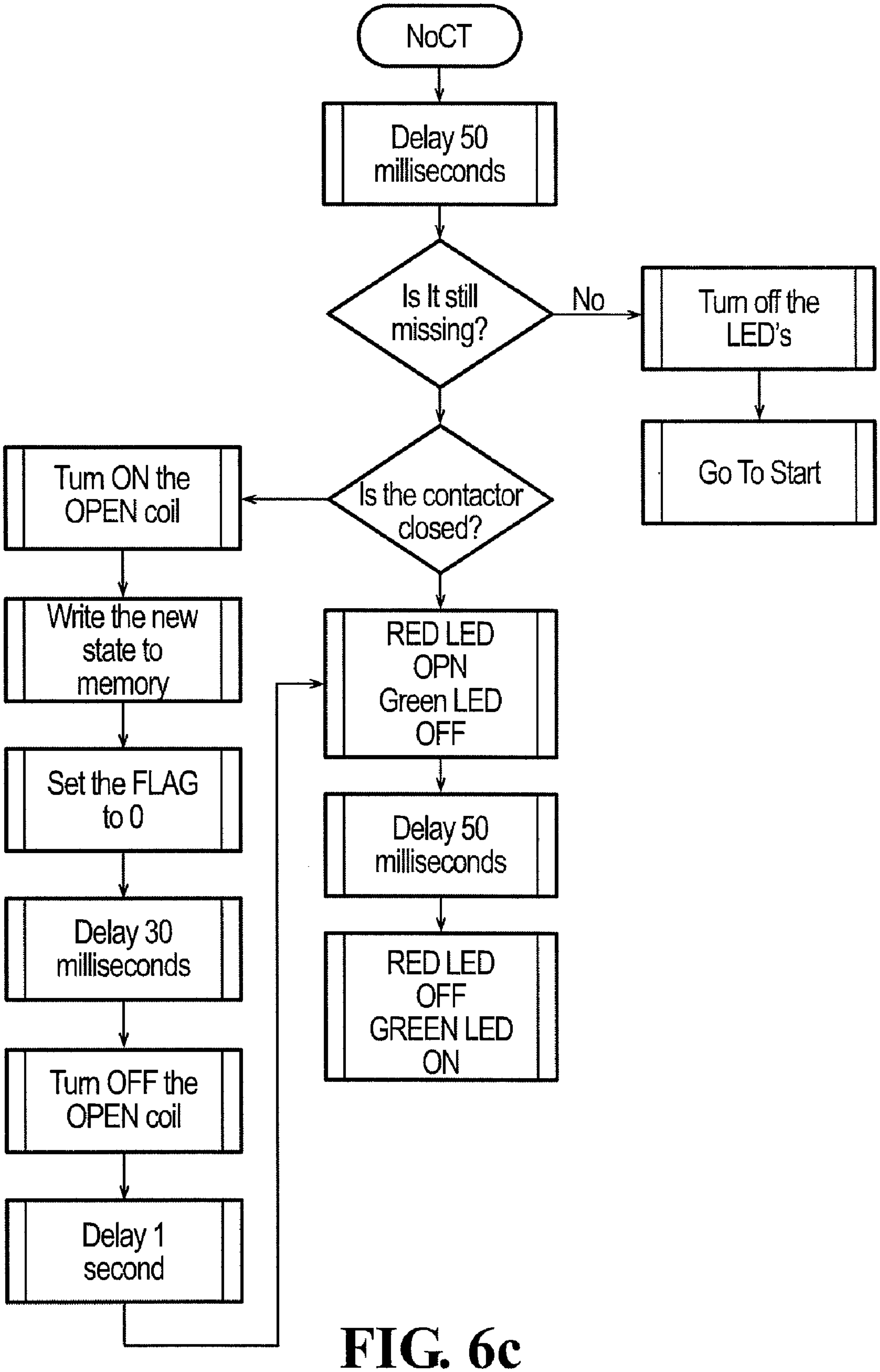
Figure 6D:
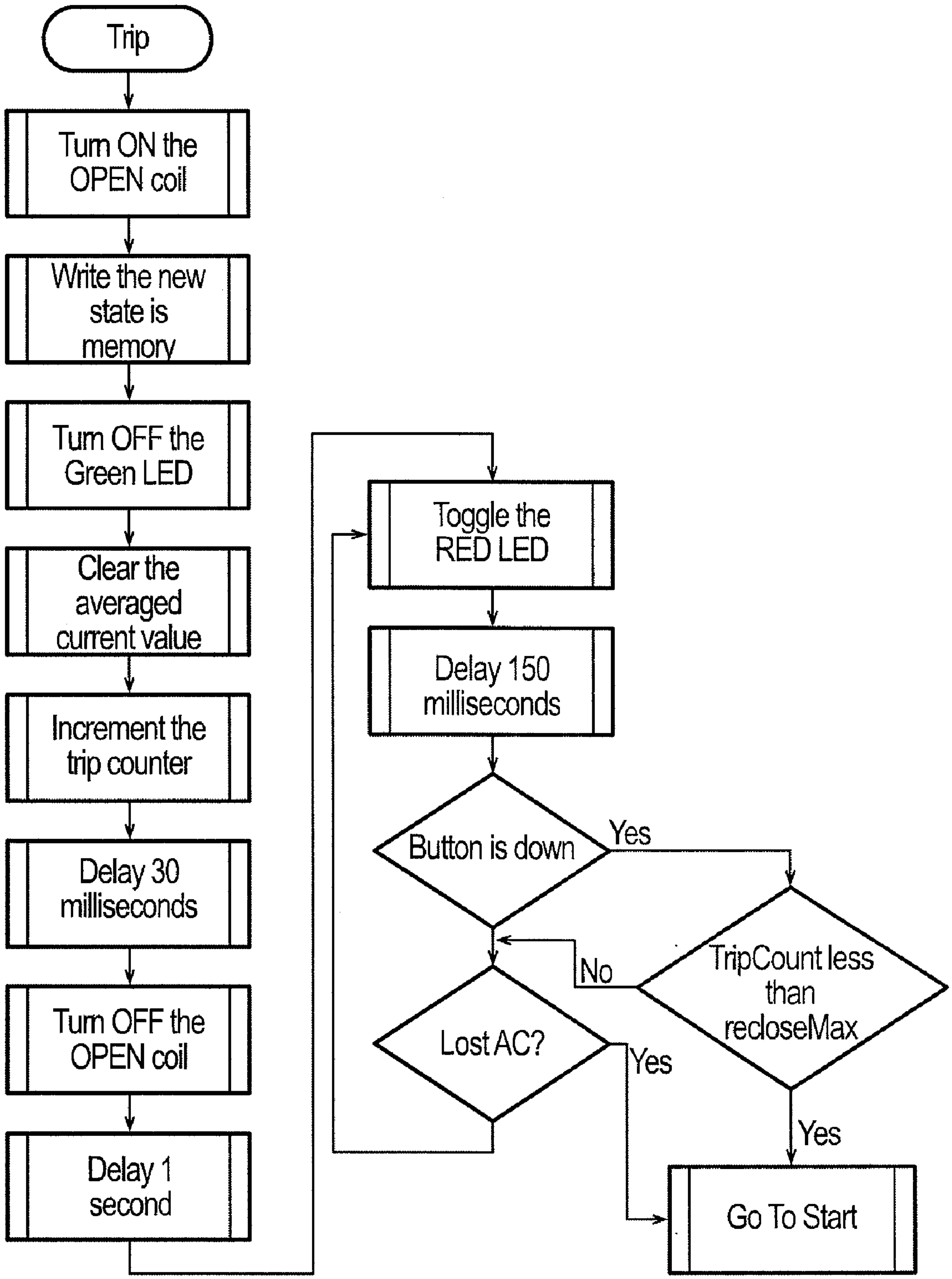

Once the startup conditions are satisfied, the contactor is closed, current imbalance monitoring begins as shown in FIG. 6*b*. During startup and while the Interrupter is in monitoring mode microprocessor U1 is constantly checking at step 501 to ensure that the current sensor 13 is still attached. If current sensor 13 is removed, the contactor 18 immediately is signaled to open and the red and green LEDs alternate rapidly as shown in FIG. 6*c*.

In the ground fault monitoring process, after checking the AC input at 502, the microprocessor U1 converts the voltage from the analog processing circuitry of sensor 13 and U3 described above to a digital value at 505. This digital value is then averaged over several samples at 506 and then compared to a preset threshold at 507. If the threshold is exceeded, the trip sequence is started at 508 whereupon a signal is sent to open the contactor, as shown in the trip sequence in FIG. 6*d*. At the same time, the microprocessor writes the new "tripped" state to its nonvolatile memory and blinks the red LED D6 rapidly. An internal trip counter is also incremented. The user is allowed to re-close the contactor by pressing and holding the pushbutton. This process may be repeated a limited number of times, for example 3 times depending on the selected programming, and then it locks out the contactor until input power is removed.

Figure 6E:
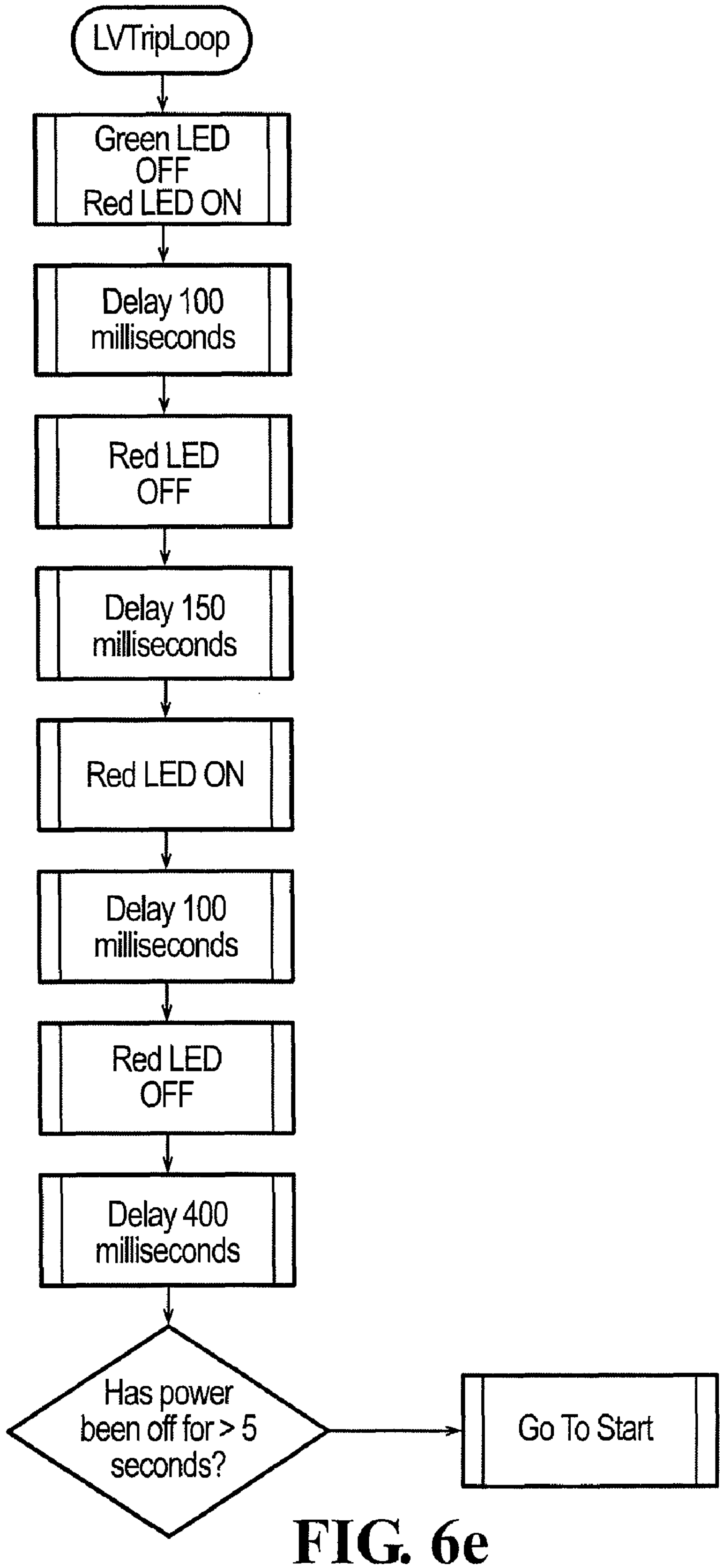

In addition to monitoring for current imbalance using the input from current sensing transformer 13, if the input voltage drops below a preset minimum, usually 180 volts, as indicated by optically-isolated circuit D1/D7/U5, for longer than a preset time, usually two seconds, the microprocessor will send the signal to open the contactor, as shown in FIG. 6*e*. Once the input voltage returns to a normal value the contactor will re-close. This feature allows power to the building to automatically restore itself after brief outages or brownouts.

Figure 6F:
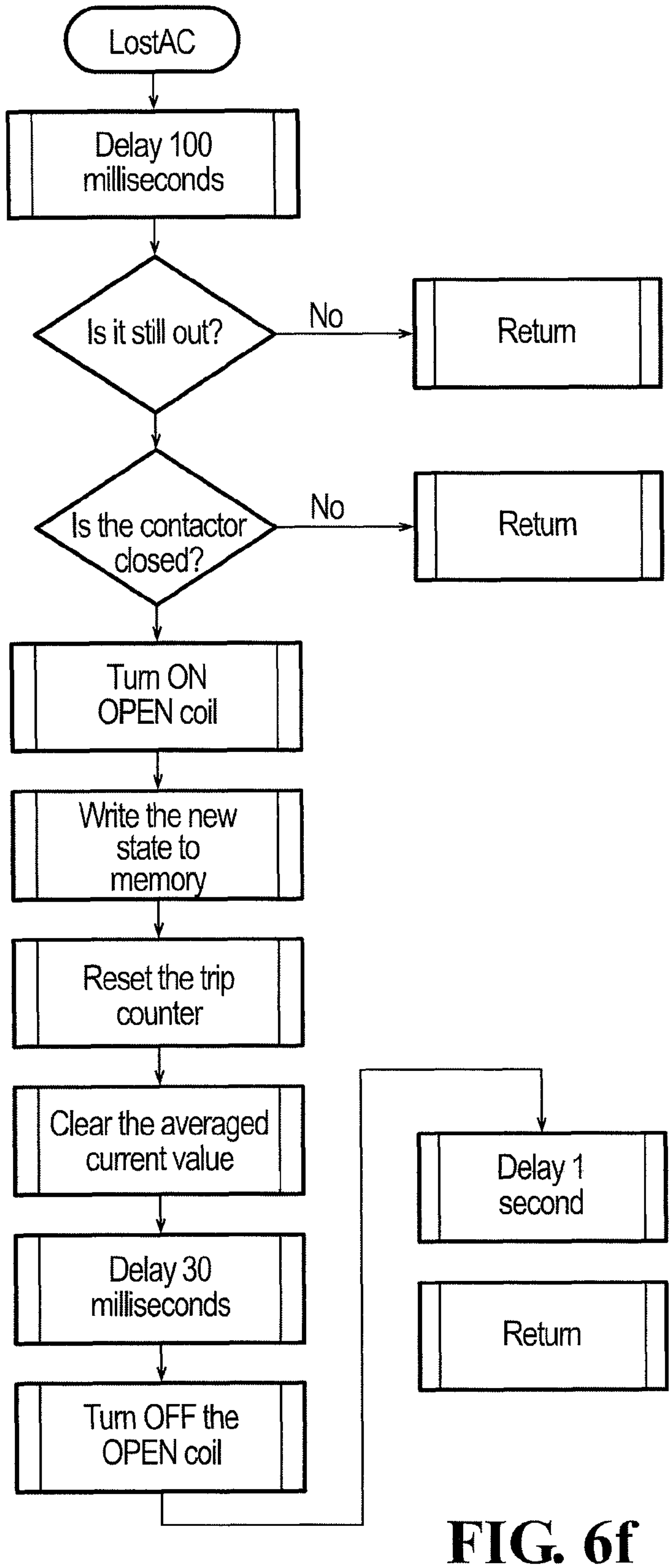

If the check of the AC input at 502 indicates that AC power has been lost while the service was running properly, the lost AC subroutine shown in FIG. 6*f* is initiated.

Figure 6G:
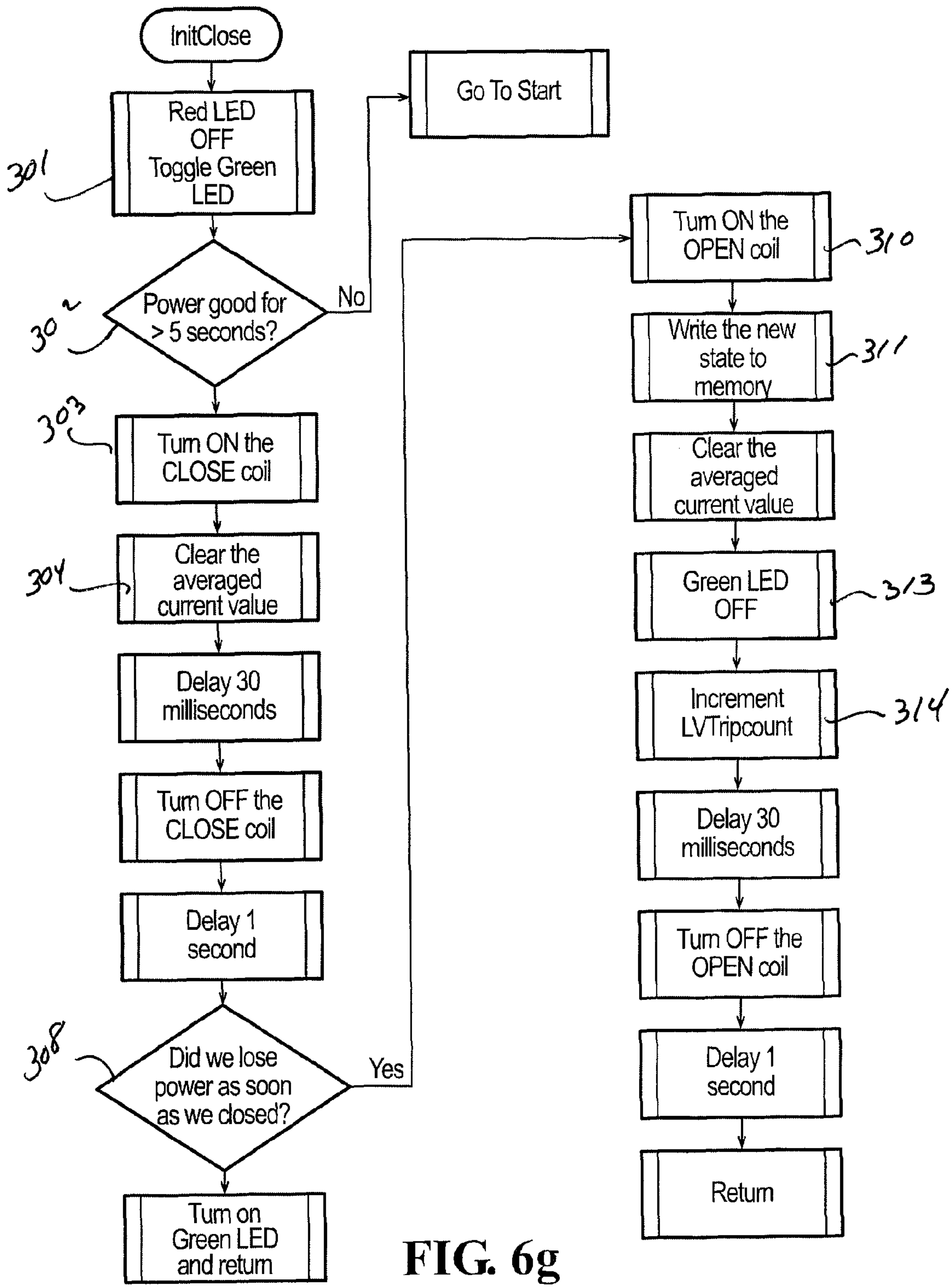
Figure 6H:
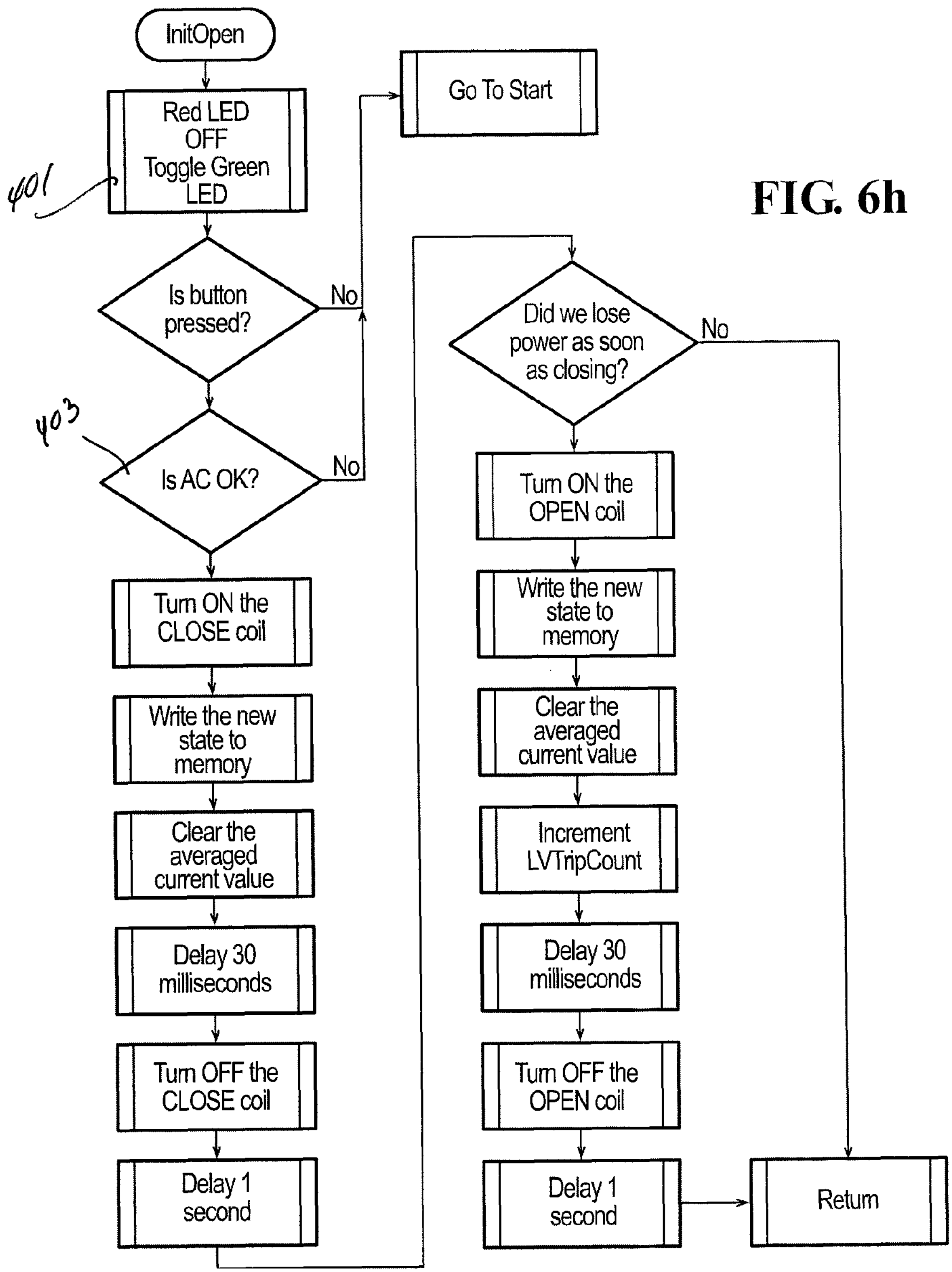

As shown in FIG. 6*g*, if power is ok and the state was ON when the interrupter was last used, at step 301 microprocessor causes the green LED to blink rapidly to indicate that the contactor is about to reclose. After a predetermined time (usually 5 seconds) has elapsed during which time the power is checked again at step 302, microprocessor U1 turns on the close coil command to Q1 or Q2 at step 303, clears the averaged current value in memory at 304, closes the main contactor and checks to see if power was lost when the coil close command is turned off at 308. If power is lost the open coil command to Q1 or Q2 is turned on at 310, the new contactor open state is written to memory at 311, average current values are cleared, the green LED D5 is turned off at 313, the low voltage trip count is incremented at 314, and the open coil command to Q1 or Q2 is turned off. The routine then returns to start. If power is not lost, the green LED D5 is illuminated steadily and the microprocessor iterates to the monitor subroutine. As indicated in FIG. 6*h*, if power is ok and step 205 indicated that power was off when the interrupter was last used, then at step 401 microprocessor U1 causes the green LED D5 to blink slowly to indicate that it is permissible to close the contactor by pressing the push-button. If it is desirable to close the contactor 18, the user will press and hold the pushbutton P3 for a predetermined time (usually 5 seconds), during which time the AC is checked again at step 403. During the time the pushbutton is held the green LED D5 blinks rapidly to indicate that the contactor is about to close. At the end of this delay the microprocessor U1 completes the routine and the contactor closes. LED D5 is illuminated steadily. As with FIG. 6G, if power is lost the microprocessor goes through a routine to open the contactor and returns to START.

In the event that one or more of the power legs has a resistive fault that allows the voltage to drop when the contactor closes, the contactor could continue to cycle on and off. This is obviously undesirable, so software has been included in the microprocessor to detect this situation and lock out the contactor after three tries as shown in FIGS. 6*g* and 6*h*. In the event of this type of lockout, the green LED extinguishes and the red LED gives a repeating double blink per FIG. 6*f*.

Additionally, we have provided a means of manually turning off power to the building while everything is operating normally by pressing the pushbutton while the green LED is lit as illustrated in FIG. 6*b*. This causes the contactor to open and the green LED will blink slowly, indicating that it is permissible to reclose when desired by pressing and holding the pushbutton.

The foregoing features and embodiments are presented by way of illustration rather than limitation therefore the appended claims should be considered as defining the proper scope of the invention.

What we claim is:

1. A ground fault interrupter for a building having associated therewith a power meter mounted in a power meter socket, positioned to interrupt utility power service to the building in case of a detected ground fault, comprising in combination:

a. A sensor for detecting the fault current at the utility power service entrance to said building, wherein said sensor is a split core current transformer having two halves adapted for engagement about said utility power service entrance between said power meter socket and said building;

b. a contactor, selectively movable between open and closed positions, mounted for temporary use in series with said power meter and utility power service to said building;

c. a microprocessor based circuit for monitoring and evaluating fault current detected by said sensor and controlling the selective movement of said contact switch between said open and closed positions, wherein said microprocessor based circuit includes a programmable microprocessor containing a monitoring program which iteratively checks ground fault current as indicated by said sensor, the state of the contactor as recorded in a memory in said circuit, whether said sensor is present, whether power is provided to the service, and the voltage level of the service as determined by an input from a voltage level detector in said circuit, said microprocessor being operable in response to detecting ground fault current, absence of power, or low voltage to open said contactor; and, d. a housing surrounding said contactor and microprocessor based circuit for cooperative engagement between a power meter socket and a power meter on the building such that said contactor is serially connected between said power meter socket and said power meter.

2. A ground fault interrupter as defined in claim 1, wherein the halves of said sensor are adapted for engagement with each other by magnetic connectors to secure said transformer about said service entrance.

3. A ground fault interrupter as defined in claim 1, wherein said sensor comprises a flexible Rogowski coil adapted for engagement about said service entrance.

4. A ground fault interrupter as defined in claim 1, wherein said microprocessor based circuit is programmed to assess the state of the contactor and control restoration of power through said contactor to said building.

5. A ground fault interrupter as defined in claim 1 further comprising human actutable input for manually providing a signal to said microprocessor based circuit to change the state of said contactor and a human perceptible indicator as to the state of the contactor.

6. A ground fault interrupter as defined in claim 1 wherein said microprocessor is programmed to control said contactor to disconnect all power to said building in the event that the voltage supplied to the building becomes unacceptably low.

7. A ground fault interrupter as defined in claim 6 wherein said microprocessor is programmed to control said contactor to reconnect power to said building once the voltage is within an acceptable range.

* * * * *